ic

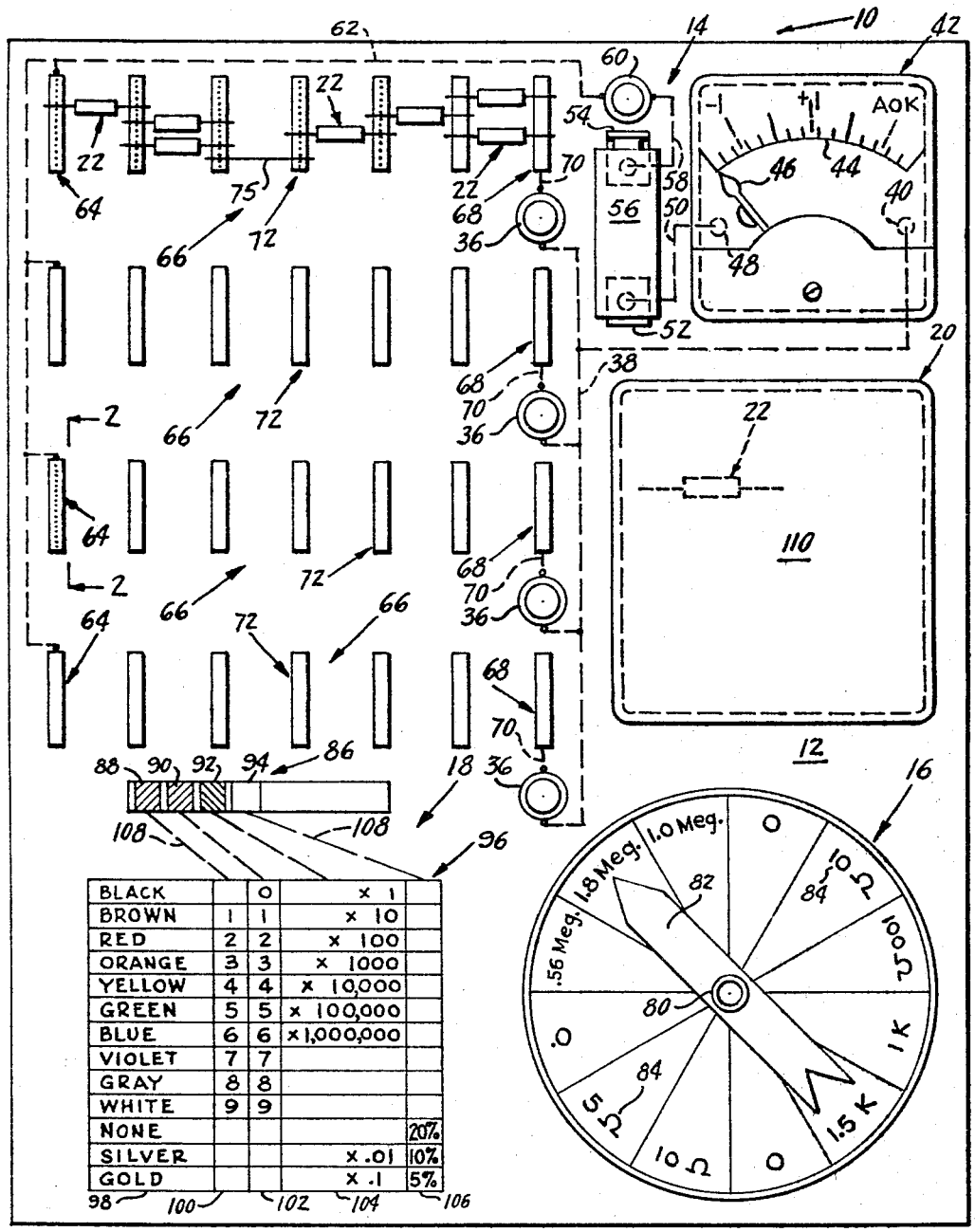
FIG. 1
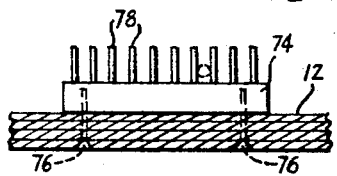
FIG. 2
FIG. 3
INVENTOR.
WALTER P. BROWN
BY Kimmel, Crowell & Weaver
ATTORNEYS.

United States Patent Office 3,374,556
Patented Mar. 26, 1968

1

3,374,556
GAME
Walter P. Brown, Reedsville, Ohio 45772
Filed Nov. 29, 1965, Ser. No. 510,193
6 Claims. (Cl. 35—19)

ABSTRACT OF THE DISCLOSURE

Apparatus including a game board on which are mounted a plurality of electrical components arranged and disposed in a plurality of open electrical circuits including a source of electrical energy and an electrical current indicating means, the components including as parts thereof a plurality of sequences of electrically insulated electrical connector means to releasably receive and electrically connect in series and in parallel randomly selected electrical resistances of differing ohmic values to complete one or more of the circuits, each of the sequences being in parallel with the others, and switch means connecting the current indicating means in the completed electrical circuits to indicate if such completed circuits satisfy Ohm's law.

This invention relates to an educational game, and more particularly to a device of this character for learning the markings found on conventional resistors and for learning the effect of placing resistors in parallel rather than in series.

Resistors are conventionally cylindrical in shape having a wire disposed at each end thereof extended along the longitudinal axis thereof with a plurality of colored bands being provided adjacent one end of the cylinder for indicating the strength of the resistor. Repairmen of electrical devices come to recognize the ohmic value of a resistor by glancing at the markings thereon while a person not engaged in such a vocation is normally blithely unaware of the differences involved.

It is a primary object of the instant invention to provide an educational game for teaching the meanings of the markings found on conventional resistors.

Another object of the instant invention is to provide an educational game which markedly illustrates the difference between the effective resistance of resistors in series as compared to resistors in parallel.

Still another object of the instant invention is to provide an educational game of the character described which may be easily and inexpensively manufactured, which is long lasting and durable, and which may be used by persons of any age.

A further object of the instant invention is to provide an educational game of the character described which may be used by a single person or a plurality of players.

Other objects and advantages of the instant invention, as well as the invention itself, reside in the combinations of elements, arrangements of parts, and features of construction and operation, all as will be more fully pointed out hereinafter, and disclosed in the accompanying drawing wherein there is shown a preferred embodiment of this inventive concept.

In the drawing:
FIGURE 1 is a front elevational view of the game of the instant invention;

FIGURE 2 is a partial cross-sectional view of the game of FIGURE 1 taken substantially along line 2—2 thereof, viewing in the direction of the arrows and illustrating one of the connecting means; and FIGURE 3 is a front elevational view of a resistor of the type which may be used in the play of the game of the instant invention.

Referring now to the drawing in detail, wherein like reference characters designate like elements throughout

2 the several views thereof, there is indicated generally at 10 the game device of the instant invention having as its major components a board 12 which may be of any suitable configuration, but which is illustrated as rectangular, an electrical circuit designated generally at 14, a random selection device designated generally at 16, a conversion scale denominated generally at 18 for translating the markings on a resistor into ohmic values and an openable receptacle shown generally at 20 receiving a plurality of resistors indicated generally at 22.

Resistors 22 are of a conventional type and include a cylindrical body portion 24 housing the resistance creating components of the device with a pair of lead wires 26 extending away from body portion 24 parallel to the longitudinal axis thereof. The normal coding scheme of marking resistors is to provide a plurality of colored rings about one end of body portion 24. A first colored ring 28 designates the first significant figure of the resistance of resistor 22 with a second colored ring 30 providing a second significant figure. A third colored ring 32 provides the multiplier with a fourth colored ring 34 providing an indication of the tolerance of the resistance value indicated on body portion 24.

For purposes of explanation, and as will be more fully explained hereinafter in conjunction with the description of conversion scale 18, it is assumed that the color of first ring 28 corresponds to a value of 4 while the color of second ring 30 corresponds to a value of 5. The value of the resistance of device 22 is therefore some multiple of 45. If the multiplier obtained from the color of third ring 32 is .1, the resistance of the device is 4.5 ohms with the color of fourth ring 34, assuming a 10% tolerance, indicates that the value is 4.5 ohms ±10%.

Electric circuit 14 includes a plurality of push-to-close, normally open switches 36 connected in parallel by a wire 38 to a connection 40 of an ammeter shown generally at 42 which is affixed in any suitable manner to board 12. Ammeter 36 includes the customary transparent cover through which may be seen a scale 44 and a movable pointer 46. The other connection 48 of ammeter 36 is connected by a suitable current carrying wire 50 to a resilient electrical connector 52 on board 12. Another resilient connector 54 is secured to board 12 and aligned with connector 52 receiving a source of electrical energy 56 therebetween, illustrated as a pen-light dry cell battery. A current carrying wire 58 places connector 54 in communication with a switch 60 of the type which may be manipulated to open or close circuit 14. A current carrying wire 62 places switch 60 in communication with an initial connecting means shown generally at 64 of a number of connector sequences shown generally at 66.

Each of sequences 66 also includes a terminal connecting means shown generally at 68, each of which is connected by a wire 70 to switch 36, and a plurality of intermediate connecting means indicated generally at 72. Connectors 64, 68, 72 are substantially identical and include a block 74 of an electrically conductive material secured to board 12 by nails 76 or the like as may be seen in FIGURE 2. Each connector 64, 68, 72 also includes a plurality of vertical spring fingers 78 which are normally biased apart by the insertion of lead wires 26 therebetween. Since each block 74 is electrically separated from the remainder, it will be apparent that circuit 14 is completed only by the insertion of resistors 22 or a short length of wire 75 between connectors 64, 68, 72.

Random selection device 16 includes an upstanding post 80 on board 12 carrying a spinner 82 with a plurality of indicia 84 adjacent post 80 designating the resistance value of the resistors to be inserted between fingers 78 of connectors 64, 68, 72.

Conversion table 18 includes a simulated resistor body shown generally at 86 having first, second, third and fourth color rings 88, 90, 92, 94. Conversion scale 18 also includes a table shown generally at 96 having a first vertical column 98 having a series of colors thereon, a second vertical column 100 designating a first significant digit, a third vertical column 102 providing a second significant digit, a fourth vertical column 104 providing a multiplier to be applied against the significant figures obtained from columns 100, 102 and a fifth vertical column 106 providing a percentage figure indicative of the accuracy of the resistance value determined from columns 100, 102, 104.

Four dashed lines 108 connect color rings 88, 90, 92, 94 with columns 100, 102, 104, 106 such that the determination of the resistance of a particular resistor may be readily computed. Referring back to the example used in calculating the resistance of resistor 22, it will be seen that first color ring 28 is yellow, second color ring 30 is green, third color ring 32 is gold and fourth color ring 34 is silver. The first significant figure of the resistance corresponding to the first yellow ring will be seen from table 96 to be 4 while the second significant figure corresponding to a second green color ring will be seen to be 5. The multiplier corresponding to a third gold ring will be .1 while the percentage tolerance corresponding to a fourth silver ring will be seen to be ±10%.

Receptacle 20 is illustrated as a rectangular box fixedly secured to board 12 having a removable lid 110 providing access to the interior thereof which a plurality of resistors 22 are positioned. It should be understood, however, that receptacle 20 may be of any suitable shape and may be provided along with game device 10 although not secured to board 12.

In the play of the game of the instant invention, the player will rotate spinner 82 to indicate a resistor of a particular value. Assuming spinner 82 comes to rest in the position shown in FIGURE 1, the resistance value of the first resistor is 1.8 meg. which is 1,800,000 ohms. The player will consult table 96 to determine the color coding corresponding to such a resistance value, ascertaining that the first coloring should be brown, the second coloring should be grey, and the third coloring should be blue. The player will then retrieve such a resistor from receptacle 20 and insert it between initial connector 64 and the adjacent one, which is second connector 72.

The player will rotate spinner 82 in order to select an additional resistor to connect each intermediate connector with the one immediately to the right thereof. Assuming that the next four rotations of spinner 82 results in the selection of resistors having resistance values of 0, 10, 100 and 1000, the overall effective resistance of the series path of connecting means 60, 66, 70 may be ascertained by the following formula:

$$Re = R1 + R2 + R3 + R4 + R5$$
$$= 1,800,000 + 0 + 10 + 100 + 1000$$
$$= 1,801,110$$

The 0 resistor corresponds very roughly to the resistance of wire 75 with wire 75 and resistors 22 being positioned in order to form an electrical path between initial and terminal connecting means 64, 68. After the electrical path has been established, the player may be provided an extra predetermined number of resistor selections in an attempt to overcome the very large resistance established by the series relation as indicated by the previous computation.

Assuming that the two selections indicated by spinner 82 are 0 and 10, the player must select such resistors from receptacle 20 and decide where to place them in the series path of connecting means 64, 68, 72. Eventually, the player will learn, either by trial and error or by deduction, that the resistor should be realigned such that the short pieces of wire are by themselves with the remaining extra resistors being placed in parallel with a high valued resistor. In so doing, the player will learn that the conductive capacity of a pair of parallel resistances is greater than the conductive capacity of either. Recalculating the effective resistance of the series path of connecting means 64, 68, 72 after rearranging the resistors in a most advantageous manner, the effective resistance of the path may be calculated as follows:

$$Re = R1 + R2 + R3 + R4 + R5$$
$$= R1 + R2 + R3 + \left(\frac{1}{\frac{1}{Ra} + \frac{1}{Rb}}\right) + \left(\frac{1}{\frac{1}{Rc} + \frac{1}{Rd}}\right)$$
$$= 0 + 0 + 10 + \left(\frac{1}{\frac{1}{100} + \frac{1}{1000}}\right) + \left(\frac{1}{\frac{1}{10} + \frac{1}{1,800,000}}\right)$$
$$= 10 + \left(\frac{1}{.01 + .001}\right) + \left(\frac{1}{.1 + .000000555}\right)$$
$$= 10 + \frac{1}{.011} + \frac{1}{.1}$$
$$= 10 + 91 + 10$$
$$= 111.0$$

When the player depresses switch 36, a certain amount of current will flow through circuit 14 depending upon the voltage of battery 56 and the effective resistance of the system. Assuming that battery 56 develops 1.1 volts and the effective resistance of ammeter 42, wires 38, 50, 58, 62 and switches 36, 60 are zero, the expected reading on ammeter 42 may be calculated as follows:

$$V = Ri$$
$$1.1 = 111.0i$$
$$i = 1.1/111.0 = .0099 \text{ amperes}$$
$$= 9.9 \text{ milliamps}$$

The player will move switch 60 to the on position and then depress switch 36 and ascertain that a certain amount of current is flowing through circuit 14, but it will be noted that pointer 46 will reside below the minus 1 line indicating at the 25 milliampere mark on scale 44. If a group of players are enjoying the game of the instant invention, the first player's inability to achieve a 25 milliamp current flow through circuit 14 may be used against him by the subsequent player taking a resistor 22. In the event the first player achieves a current flow greater than the plus 1 indicia at the 75 milliampere mark on scale 44, the player may rotate spinner 82 again to withdraw another resistor 22 from receptacle 20. The player is not allowed, however, to insert this additional resistor into electrical circuit 14 until each player has had a turn.

Each player will perform essentially the same steps as previously enumerated using one of the other sequences of resistors shown in FIGURE 1. The first player that achieves a current flow greater than the A.O.K. indicia at the 125 milliampere mark on scale 44 is declared the winner.

While many changes may be made in the hereinbefore disclosed embodiment, it should be pointed out that at least three connectors are required to be arranged in series in order to import into the game any mental activity on the part of the players. If only two connectors are used, the only thing the player can do is insert additional resistors therebetween. The use of only two connectors precludes the necessity of matching resistors to achieve an overall minimum effective resistance.

It is now seen that there is herein provided an improved educational game having all of the objects of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. An educational game comprising
a board;
an electrical circuit on said board including
   a source of electric energy,
   an ammeter,
   a normally open circuit closing switch,
   a plurality of sequences of spaced apart electrically insulated connecting means for releasably and selectively receiving resistors of different capacities between adjacent pairs thereof to provide an electrical path through each sequence, each sequence comprising at least three of said connecting means and including first and terminal ones thereof, a normally open switch connected in series with each of said sequences and each sequence being connected in parallel with the others thereof,
   current carrying means connecting said first connecting means through said source, ammeter and circuit closing switch to said terminal connecting means of each sequence whereby closing of said circuit closing switch and at least one of said series connected switches will provide a predetermined reading on the ammeter in accordance with the effective capacity of selected resistors to be connected in said connecting means.

2. The game of claim 1 wherein the connecting means each include an electrical conductor secured to the board and a plurality of upwardly extending spring fingers on the conductor.

3. The game of claim 1 including a plurality of resistors having a central body portion and a wire leading from each end thereof, the connecting means including means for holding the resistor wires, at least one resistor being secured between each of the adjacent connecting means thereby electrically connecting the first connecting means to the terminal connecting means.

4. The structure of claim 3 wherein the connecting means include a block shaped conductor secured to the board and a plurality of upwardly extending spring fingers on the conductor, the resistor wires being secured between spring fingers of adjacent connecting means.

5. The structure of claim 4 including chance operable means to designate the resistance values of certain resistors to be connected between a selected pair of adjacent connecting means.

6. The structure of claim 5 including a receptacle mounted on said board to releasably receive and retain a number of the resistors for random selection and connection between adjacent pairs of said connecting means.

References Cited
UNITED STATES PATENTS

| | | | |
|---|---|---|---|
| 1,705,315 | 3/1929 | States | 35—19 |
| 2,592,552 | 4/1952 | De Florez et al. | 35—19 |
| 2,983,892 | 5/1961 | Williams et al. | 35—19 X |

EUGENE R. CAPOZIO, *Primary Examiner.*

H. S. SKOGQUIST, *Assistant Examiner.*